April 24, 1934. H. JUNKERS 1,956,355
INTERNAL COMBUSTION ENGINE
Filed April 4, 1931

Inventor:
Hugo Junkers
by Karlkirlaren
Atty.

Patented Apr. 24, 1934

1,956,355

UNITED STATES PATENT OFFICE

1,956,355

INTERNAL COMBUSTION ENGINE

Hugo Junkers, Dessau, Germany

Application April 4, 1931, Serial No. 527,703
In Germany February 18, 1931

2 Claims. (Cl. 309—33)

My invention relates to internal combustion engines and more particularly to the packing rings of the pistons forming part of such engines.

It is an object of my invention to provide a piston which is particularly suitable for high-pressure engines, for instance Diesel engines, in which the maximum combustion pressure is of the order of 600 lbs. per sq. in., and with this object in mind I so design a packing ring that it will bear the largest share of the gas pressure by making it long as compared with its diameter, arranging it in the vicinity of the combustion chamber, and building it up from two split annular members arranged with their joints staggered.

The comparatively long built-up ring according to my invention will be referred to as the "principal" ring. Preferably the wall thickness of the principal ring is small as compared with the diameter of the piston, so that it will make a good fit with the cylinder wall on account of its resiliency, and preferably the principal ring is equipped with an inwardly projecting shoulder engaging a groove in the piston so that the major portion of the principal ring is exposed to the gas pressure on its inner surface, without interference by coke or other foreign matter which may form in the groove. In a built-up ring the shouldered portion is preferably designed for the reception of the annular member referred to.

Clogging of the groove in which the principal ring engages may be prevented by forming the groove partly by the piston and partly by a washer which is placed on the piston head, as described in my copending application for patent of the United States, Ser. No. 500,014, filed December 4, 1930. This washer which preferably bears on the piston head with a small area only so that its heat convection to the piston is reduced to a minimum, becomes very hot in operation, and coke which may form in the groove is burnt immediately. The temperature of the principal ring is not influenced appreciably by the hot washer as its large outer surface is in contact with and effectively cooled by the cylinder wall.

By providing a principal ring as described which bears the largest share of the gas pressure, a stable distribution of the pressure is obtained. Heretofore it was believed that in high pressure engines many packing rings should be provided not only in order to present an intricate labyrinth packing to the high pressure but also in order to have a stand-by in case of failure of one or more rings by sticking in their grooves. However, such a packing is unsatisfactory because the pressure is distributed over the rings substantially uniformly and not applied to one of the rings for the major part. In a piston having newly fitted rings, one of them, and as a rule the ring which is nearest the combustion chamber, will be the first to make a good fit on the cylinder wall. This ring therefore will bear the largest share of the gas pressure and act as the principal ring. However, this stable condition lasts only until the other rings have run down to a good fit on the cylinder wall. The share of the first-mentioned ring is reduced and the pressure is distributed more uniformly over all rings. If trouble occurs with any one of the rings, for instance, if coke forms in its groove and interferes with its radial movement the ring becomes more or less leaky and its share of the pressure is reduced in proportion until it finally sticks in its groove altogether.

It follows that conditions become instable after the rings of a piston have been ground to a substantially uniform packing action, as a comparatively small interference with the packing action of one of the rings rapidly renders this ring inactive. The liability to failure of one, or some, of the rings is the greater the higher the pressure and the higher the temperature of the gases blowing out past leaky rings and the more frequently such blowing-out occurs, in other words, it increases with the pressure, the temperature of the piston, and the speed of the engine. Conditions are particularly unfavorable in uncooled pistons and two-cycle engines.

By so designing one of the rings according to my invention that it bears the largest share of the pressure and by so arranging this principal ring that it is not likely to give trouble, stable conditions are permanently provided for.

In the drawing affixed to this specification and forming part thereof a piston embodying my invention is illustrated diagrammatically by way of example.

In the drawing

The principal ring is shown as built up from two members. The member 4 is the body of the principal ring, and the member 5 is inserted in the body, preferably at the end facing the piston where the inwardly projecting shoulder 6 is provided. The body member 4 is split at 7, and the ring member 5 is split at 8, the joints being staggered.

Figure 1:
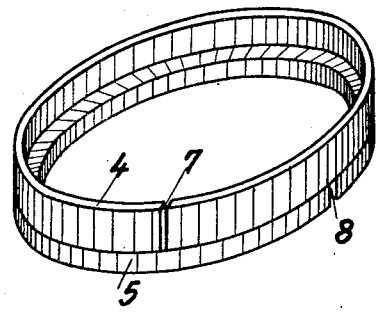
Fig. 1 is a perspective illustration of the principal ring.

As mentioned, the length $b$, Fig. 1, of the principal ring is large as compared with its diameter. If $d$ is the piston diameter in millimetres, the minimum length of the principal ring should be $$b = 2 + .06d.$$

For the reasons stated the thickness of the principal ring, that is, its radial dimension, should be small with the exception of the shoulder 6.

Figure 2:
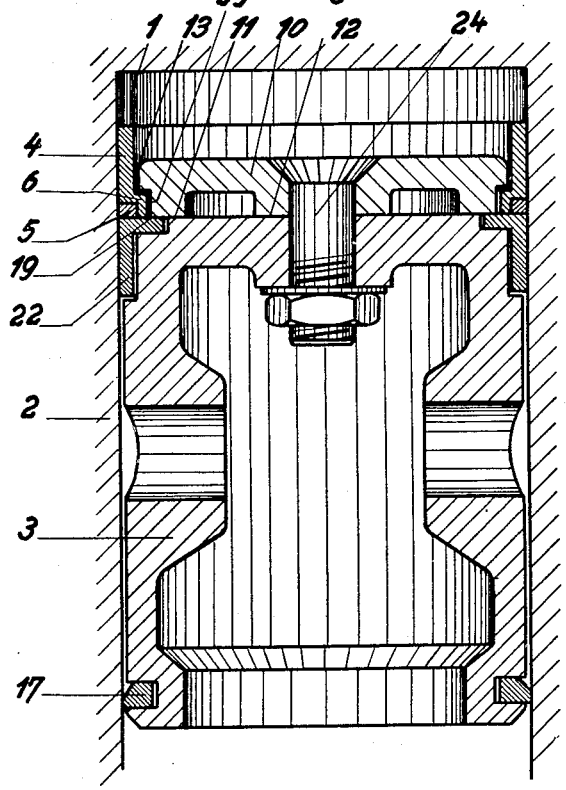
Fig. 2 is a part section of a cylinder with its piston this latter being shown in axial section, the principal ring being combined with an undivided packing ring.

Referring now to Fig. 2, 1 is the combustion chamber at the inner end of a cylinder 2 which is only partly shown, 3 is the piston, 17 is a wiper at the outer end of the piston skirt, and 10 is a washer which is secured to the piston head by a central screw (not shown). The outside diameter of the washer is so determined with relation to the inside diameter of the principal ring that a clearance 13 is formed between the outer face of the washer and the inner face of the body 4. 23 is a groove in the washer in which the shoulder 6 of the principal ring is held at some clearance.

The built-up principal ring is held on the piston head which adjoins the combustion chamber 1 by the washer 10. The axial dimension of the principal ring, is large in relation to the piston diameter, its minimum being calculated by the above equation, while its radial dimension is comparatively small with the exception of the shoulder 6. The shoulder 6 serves for retaining the principal ring in the groove 23, and also for the accommodation of the ring member 5. The faces of both members constitute a single surface at the perimeter and at the seat 9 of the principal ring. By splitting both members as shown in Fig. 1 they are applied resiliently to the wall of the cylinder in the usual manner but their joints 7 and 8 are staggered so that the joint of one member is closed by the solid portion of the other member, in cooperation with the seat 9 which is constituted by both members. It has been found that such built-up rings make a tighter fit and last longer than the usual single rings.

The shoulder 6 at the inner end of member 4 engages in the groove 23 which is constituted at one end by the piston head and at the other by a shoulder on the washer 10. Gas from the combustion chamber is admitted through the clearance 13 so that the body 4 is applied to the wall of the cylinder under the full pressure in the combustion chamber 1 and on account of its small thickness fits the wall very tightly in the manner of the well-known leather-collar packing, thus further improving the packing action.

The principal ring 4, 5 is combined with a preferably flanged undivided ring 22 of L-section which is equipped with a flange or seat 19 at its outer end on which the end of the built-up principal ring 4, 5 is fitted. In this manner the undivided ring 22 affords a smooth guiding face for the piston on the cylinder and its flange 19 forms a tight seat for the principal ring. The principal ring bears the greatest share of the pressure as the undivided ring 22 notwithstanding its being fitted exactly in the cylinder will not partake in the packing to an appreciable extent on account of the inevitable wear to which it is subjected.

I wish it to be understood that I do not desire to be limited to the exact details of construction shown and described for obvious modifications will occur to a person skilled in the art.

I claim:

1. An internal combustion engine having a cylinder, a piston mounted to slide in said cylinder, an undivided ring of L-section on said piston which undivided ring has a cylindrical web in contact with the cylinder wall, and an inwardly projecting flange, a split packing ring seated on the inwardly projecting flange of said undivided ring, which split packing ring is long as compared with its radial width and is arranged in the vicinity of the combustion chamber of said engine, and a gap-bridging member in a groove at that end of said packing ring which is remote from the combustion chamber, said member being flush with the perimeter and with the outer end face of said packing ring.

2. An internal combustion engine having a cylinder, a piston mounted to slide in said cylinder, an undivided ring of L-section on said piston which undivided ring has a cylindrical web in contact with the cylinder wall, and an inwardly projecting flange, a split packing ring seated on the inwardly projecting flange of said undivided ring, which split packing ring is long as compared with its radial width and is arranged in the vicinity of the combustion chamber of said engine, a gap-bridging member in a groove at that end of said packing ring which is remote from the combustion chamber, said member being flush with the perimeter and with the outer end face of said packing ring, and a washer on said piston adapted to hold said packing ring and bearing on said piston with a small area.

HUGO JUNKERS.